Aug. 20, 1963     H. C. EARLY     3,101,440
VOLTAGE REGULATOR FOR HIGH VOLTAGE POWER SUPPLIES
Original Filed July 1, 1957
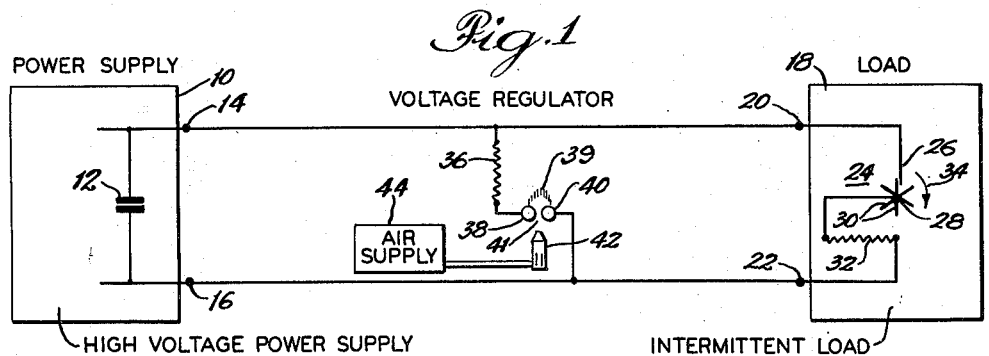
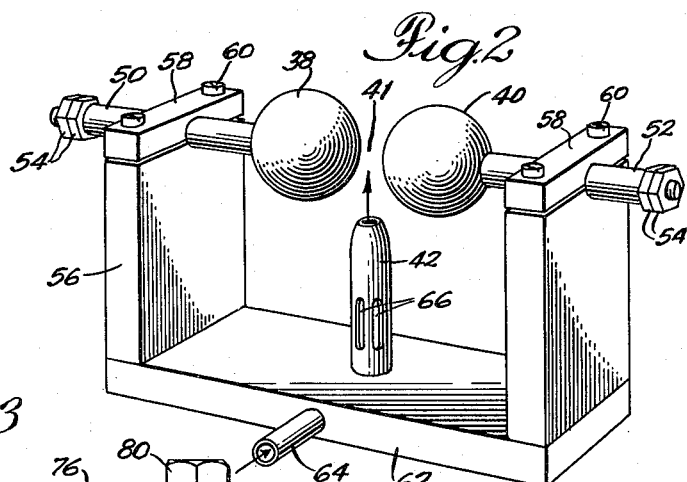
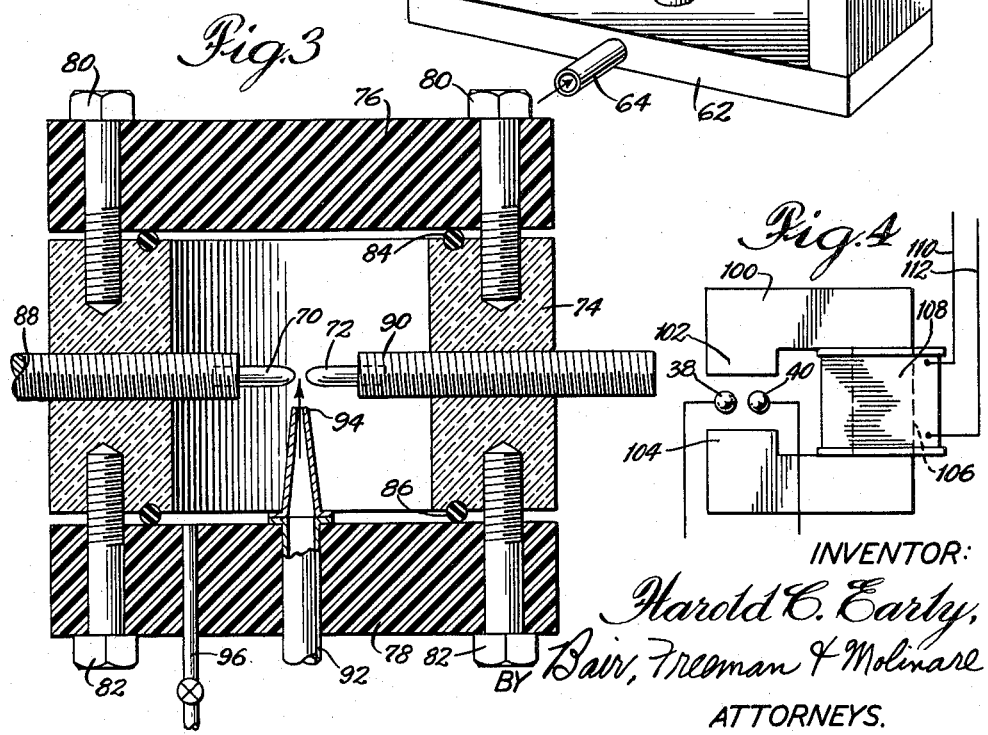
INVENTOR:
Harold C. Early,
BY Bair, Freeman & Molinare
ATTORNEYS.

United States Patent Office 3,101,440
Patented Aug. 20, 1963

3,101,440
VOLTAGE REGULATOR FOR HIGH VOLTAGE POWER SUPPLIES
Harold C. Early, Ann Arbor, Mich., assignor to Meredith Publishing Company, Des Moines, Iowa, a corporation of Iowa
Original application July 1, 1957, Ser. No. 669,187, now Patent No. 2,981,883, dated Apr. 25, 1961. Divided and this application June 13, 1960, Ser. No. 35,762
6 Claims. (Cl. 323—16)

This invention relates generally to electrical control systems and more particularly to an improved voltage regulator for a high voltage power supply. This application is a division of my co-pending application Serial No. 669,187, filed July 1, 1957, now Patent No. 2,981,883.

It is known that the need for regulated high voltage power supplies is of growing commercial importance. This is the result of the increasing use of high voltage systems in industry, as for example, the high voltage electrostatic generators used for sterilizing foods and drugs, and for the hardening of plastics through the generation of beta radiation, the high voltage X-ray machines in medical and industrial use, the projection television systems used in theaters, and the like.

In such systems, regulation of the output from the high voltage power supply is required for a number of reasons which include variations in load; fluctuation in the A.C. supply voltage, a condition of particular importance in mobile equipment, and the operating characteristics of the high voltage supply itself. The latter category includes high voltage electrostatic generators of the Van de Graaf type which are used to generate beta and gamma radiation as the output voltage from these generators is affected by such factors as the condition and temperature of the belt, in addition to the dielectric properties of the insulating gas.

Various types of voltage regulators for power supplies are known in the art. Generally these regulators comprise electronic apparatus including electronic voltage stabilizers which employ a series regulating tube, magnetic voltage regulators utilizing magnetic saturation, gaseous voltage regulating tube circuits or ballast lamp circuits.

While such prior art voltage regulators have proved generally satisfactory for low voltage power supplies and substantially constant loads, it will readily be appreciated by those skilled in the art that the use of such regulating systems, with power supplies having outputs in the thousands of volts and with fluctuating loads or A.C. supplies, is seriously limited by the expensive and cumbersome nature of the equipment required for satisfactory performance.

Accordingly, it is a general object of this invention to provide an improved voltage regulator for a high voltage power supply.

More particularly, it is an object of this invention to provide an improved voltage regulator for a high voltage power supply which is characterized by its relative simplicity, its efficiency, and its economy of construction and operation.

It is still another object of this invention to provide such a voltage regulator which is adapted for use with widely varying loads, as for example, loads which intermittently vary from no load to full load condition.

It is still another object of this invention to provide an improved voltage regulator for use with a high voltage power supply which samples the power supply output at high repetition rates to the end that the voltage output is maintained at a substantially constant value over a wide range of load variation.

It is a further object of this invention to provide such an improved high voltage regulator which is extremely compact and which requires relatively few component parts.

These and other objects are realized in an illustrative embodiment of the invention wherein the voltage regulator takes the form of a pair of electrodes connected across the output of the high voltage power supply and spaced to define a gap therebetween. The spacing of the gap is such that with any particular size and shape of electrodes utilized, the gap is caused to break down when the voltage output of the power supply exceeds the desired level.

In accordance with an important feature of one specific embodiment of the invention, a stream of air, such as may advantageously be provided by a mechanical blower or the like positioned adjacent the gap, is constantly blown through the gap. Thus, the spark across the electrodes resulting from the breakdown of the gap is bowed out from the electrodes by the constant stream of air and extinguished. This action of gap breakdown and spark extinguishment takes place with a spark duration interval determined by the velocity of the air stream and the gap geometry, and with a variable repetition rate of successive gap breakdowns that adjusts the average bleed current of the regulator to compensate for changes in load current.

In accordance with an important feature of a further illustrative embodiment of the invention, the spark gap of the regulator is placed in a magnetic field to eliminate the use of the constant stream of air, described above. The magnetic field is transverse to the spark channel and moves the spark sidewise until the latter is extinguished in a manner similar to the air stream. This embodiment facilitates operation of the voltage regulator in gases other than air which have superior dielectric and arc quenching properties.

Those skilled in the art will appreciate that effectively the output of the power supply is constantly being sampled at the gap by the air stream or magnetic field and that if the sampling rate is substantially higher than the maximum rate at which the power supply load will vary, extremely efficient and close control of the power supply output voltage can be achieved.

Further, those skilled in the art know that it is old to provide safety or protective devices for power supplies by placing a spark gap thereacross or by utilizing such a spark gap in conjunction with a source of compressed air which is operated only in response to occasional excessive voltages. Such protective systems serve only to safeguard system components in the event of an overvoltage from the power supply and generally comprise relatively complex circuitry wherein a relay is energized in response to the overvoltage to open a valve and allow a jet of air to extinguish the spark at the gap.

In contradistinction of such prior art systems, the instant invention is utilized with a power supply that is operated at a voltage above the desired value to cause repetitive breakdown of the gap connected across the power supply. The air stream or the magnetic field acts to repetitively extinguish the sparks across the gap at a rate which compensates for changes in load current to maintain the power supply output at a desired voltage level. Thus, highly efficient and accurate regulation of a high voltage power supply is achieved in a relatively simple and inexpensive manner.

In accordance with a further feature of this invention, the stray capacitance at the spark gap is held to a minimum value and the current limiting resistor in series with the gap is made noninductive to the end that the gap very quickly attains the potential at the output of the high voltage power supply after the spark across the gap is extinguished. It will be understood by those skilled in the art that this construction facilitates accurate and efficient regulation of the power supply despite extreme load variations. Further, the novel construction of the invention reduces the need for power supply capacitors of very large values, such as have been heretofore required for the efficient filtering and regulating power supply output voltages, as it has been found that by operating the invention at a very rapid breakdown and extinguishing rate and with a proper adjustment of the variable factors, the output voltage can be very closely regulated and even the 120 cycle ripple voltage from the power supply can be removed.

In accordance with a feature of one particular embodiment of the invention, the gap is operated in a pressure vessel. Thus, when the gap is operated under many atmospheres of pressure, extremely high voltages can be regulated with a very small electrode spacing at the spark gap and with electrodes having very small radii of curvature. As the spark displacement necessary to deionize the gap is correspondingly smaller under these conditions, very fast repetition rates at high voltages can be attained. The importance of this feature is evidenced by the fact that prior art vacuum tube regulators utilized for such extremely high voltages generally cost tens of thousands of dollars. Manifestly, this is in sharp contrast to the relatively inexpensive construction of the present invention.

The above and other features of novelty which characterize the invention are pointed out with particularity in the claims appended to and forming a part of this specification. For a better understanding of the invention, however, its advantages and specific objects attained by its use, reference is had to the accompanying drawing and descriptive material in which is shown and described an illustrative embodiment of the invention.

In the drawing:

FIGURE 1 is a schematic diagram of an illustrative continuous air stream embodiment of voltage regulator in accordance with the invention;

FIGURE 2 is a perspective view of a preferred form of continuous air stream spark gap extinguishing apparatus;

FIGURE 3 is a cross-sectional view of a pressure chamber embodiment of continuous air stream spark gap extinguishing apparatus in accordance with the invention; and FIGURE 4 is a schematic diagram illustrating a magnetic field spark gap extinguishing apparatus embodying the invention.

Referring now to the drawing, and more particularly to FIGURE 1, there is shown an illustrative embodiment of voltage regulator for a high voltage power supply comprising a power supply, indicated generally at 10, which may take any form known in the art, and which generally includes a high voltage capacitor 12 connected across the output terminals 14 and 16 of the power supply. The load 18 shown in greatly simplified form in the drawing, is connected at its terminals 20 and 22 to the power supply output terminals 14 and 16 respectively.

Although it is evident that load 18 may take any form, for the purpose of illustrating the principles of the invention, load 18 has been shown as an intermittent load, wherein the current drain on power supply 10 varies between full load and no load in a non-uniform manner. This may be attained by means of a suitable switching device symbolically illustrated at 24 and comprising a stationary contact 26 connected to load terminal 20 and a rotating contact assembly 28 having a plurality of contact members 30 adapted to sequentially engage stationary contact 26. The rotating contact assembly 28 is connected through a load resistance 32 to the other load terminal 22. Thus, it can be seen that when the contact assembly 28 is rotated, as shown by arrow 34, for example, the load on power supply 10 will be varied in an intermittent manner between full load and no load condition.

If no voltage regulator were connected across the output terminals 14 and 16 of the power supply, the power supply output voltage would vary from a maximum value at no load to a lower value at full load. It is a feature of this invention that the voltage regulator, constructed as explained in greater detail below, when connected across output terminals 14 and 16, bleeds just enough current from the power supply to maintain the power supply output constant at the lower value. Thus, the average bleed current through the voltage regulator is varied to compensate for changes in load current, thereby serving to maintain the total current through the rectifiers of the power supply constant. This, of course, results in a constant voltage output from the power supply to the load.

In accordance with the invention, the voltage output of power supply 10 is closely regulated at the desired value by means of a novel voltage regulator connected across the power supply output terminals 14 and 16 and comprising a bleed resistance 36 with one end connected to terminal 14 and the other end connected to a first electrode 38, and a second electrode 40 connected to the power supply output terminal 16. Advantageously, the first and second electrodes 38 and 40 are spaced from each other to define a spark gap 41 therebetween.

Positioned adjacent the spark gap 41 is a nozzle 42 which advantageously is operatively associated with a source of compressed air 44 or the like to the end that a jet or stream of air is constantly blown through the spark gap defined by the electrodes 38 and 40.

In the operation of the illustrative embodiment shown in FIGURE 1, the voltage output of power supply 10 is higher than the desired regulated value. It is a feature of this invention that the output voltage of power supply 10 is reduced to the desired value and maintained thereat by the action of the spark gap in cooperation with the stream of air blown through the gap by the nozzle 42. Thus, the output voltage of power supply 10 causes the gap to break down with the result that a spark 39 is formed between electrodes 38 and 40. The constantly applied stream of air applied from nozzle 42 causes the spark to be bowed outwardly from the electrodes and subsequently extinguished.

This action is immediately followed by another breakdown of the spark gap, and another extinguishment of the spark by the air stream and so on in a repetitive manner.

Advantageously, the breakdown and extinguishment of the spark 39 in the gap take place at a very rapid rate. It has been found that by proper adjustment of the variables, namely, the spacing of the electrodes, the dimensions of the electrodes, and the velocity of the air stream, the output voltage of power supply 10 can be very closely regulated. It will be appreciated that, in effect, the output voltage of power supply 10 is continuously sampled at a rate sufficient to adjust the average bleed current to compensate for changes in the load current.

One illustrative construction for the spark gap and nozzle assembly is shown in FIGURE 2 wherein the electrodes 38 and 40 are substantially spherical in shape and are adapted to be connected to the output of the power supply by means of the elongated terminal rods 50 and 52 respectively. Advantageously, each terminal rod has suitable connecting means, such as nuts 54, for facilitating connection of the electrodes to the voltage regulator circuit.

Preferably, each electrode is supported in a suitable mount such as the insulated support members 56 and the clamp members 58 which are adapted to secure the terminal rods therebetween when the clamp member 58 is fastened on the support member 56 as by means of bolts 60. The insulated support members 56 advantageously are mounted on a base member 62 upon which is positioned a nozzle 42 in air communication with inlet pipe 64 extending into the base member 62 and connected to a source of compressed air or the like.

It will be appreciated by those skilled in the art that the spacing of the gap defined by electrodes 38 and 40 may be adjusted as desired by suitable adjustment of the clamp members 58 on their associated support members 56. Further, nozzle 42 may be provided with a plurality of openings 66 to the end that air at room temperature may be drawn through openings 66 by the compressed air from source 44. This construction serves to avoid temperature problems due to the compressed air stream as the stream is used to circulate the room temperature air through the spark gap.

It is contemplated that in many applications electrodes 38 and 40 advantageously would be metal spheres, although in certain heavy duty situations involving continuous operations at high currents, Rogowsky type electrodes, as known in the art, would be very satisfactory. With such Rogowsky electrodes, the sparking would take place between parallel surfaces and hence much more spark erosion could be tolerated before the spark breakdown voltage would be affected. Further, with Rogowsky type electrodes, the pre-breakdown electric gradient in the space between the two electrodes is uniform. The edges of the Rogowsky electrodes are curved in such a manner that the maximum pre-breakdown gradient nowhere exceeds the value of uniform gradient over the flat portion of the electrodes.

When spherical electrodes are used, it is important that the electrode radius be sufficiently large to prevent corona previous to the breakdown. This keeps the breakdown voltage from becoming erratic due to the presence of corona-produced space charge in the moving air stream. It is a feature of this invention that pre-breakdown corona can be avoided by limiting the gap spacing to less than four times the electrode radius. This is true for atmospheric pressure conditions and also for pressures higher than atmospheric pressure.

In applications where a fast response is needed to a sudden change in load or line voltage, it is desirable to operate the spark gap at a much faster repetition rate and with a higher bleed current than is required for normal operation. Such faster repetition rates and quicker response times can be achieved in either of two ways; namely, (1) increasing the velocity of the air jet so as to extinguish the spark more quickly; and (2) using electrodes having smallest permissible radius of curvature.

A smaller electrode radius permits a faster extinction of the spark for a given air-stream velocity as the spark channel is displaced sidewise at the same velocity as the air stream. For small radius electrodes, the amount of air stream displacement necessary to produce a several fold lengthening, and extinction, of the spark channel is less than in the case of large radius electrodes.

It is a further aspect of this invention that quicker response times are achieved by reducing the stray capacitance of the spark gap to a minimum value and by providing a non-inductive resistor for the current limiting resistance in series with the spark gap. This arrangement enables the gap to very quickly attain the potential of the high voltage power supply after each spark extinction. Manifestly, this serves to facilitate the accurate and efficient regulation of the high voltage power supply despite extreme load variations.

A much closer electrode spacing for a given voltage requirement may be attained by operating the spark gap under pressurized conditions. A pressure vessel for achieving this end is shown in FIGURE 3 of the drawing wherein a pair of electrodes 70 and 72 are maintained in closely spaced relation in a dielectric cylinder 74 which advantageously may be formed of bonded glass laminate. The dielectric cylinder 74 is provided with a pair of plastic end plates 76 and 78 secured to opposite ends of the cylinder by means of the threaded bolts 80 and 82, respectively. The chamber defined by the inner portion of the dielectric cylinder 74 advantageously may be sealed by means of suitable O-rings 84 and 86 positioned between the cylinder and the end plates.

The electrodes 70 and 72, which preferably are formed of tungsten or a similar metal, are mounted in elongated terminal rods 88 and 90, respectively. The terminal rods advantageously are threaded so that the spacing between electrodes 70 and 72 may be adjusted as desired above the nozzle 92.

An air nozzle 92 is positioned in the end plate 78 and extends therethrough so that its tapered outlet 94 causes air to be blown at higher than atmospheric pressures through the gap defined by the electrodes 70 and 72. Preferably, an air bleed 96 is provided in end plate 78 so that the above atmospheric pressures inside the vessel may be regulated and maintained at a desired value.

In an illustrative pressure vessel constructed in accordance with the invention, as described above, the tungsten electrodes 70 and 72 each had a diameter of 3/16 inch and the inlet air through nozzle 92 was at a pressure of 20 atmospheres. The pressure inside the vessel was regulated by the air bleed 96 so that pressures of 10 atmospheres were maintained inside the vessel. It was found that in the pressure range between 0 and approximately 20 atmospheres, the breakdown voltage of the spark gap was proportional to air density. Thus, the pressurized gap permits of a much smaller spacing and a correspondingly smaller radius of curvature for each electrode than was possible for the spark gap operated at atmospheric pressure.

It has been found that not only does the pressure vessel embodiment provide a faster response time, but further it is suitable for use at higher voltages. In a pressure vessel constructed in accordance with FIGURE 3, as described above, the vessel was immersed in an oil tank for voltages above 100,000 volts.

Tests have been made with a pressure vessel in which the gap was operated at 30 atmospheres pressure and in which the spark gap spacing was 1/8 inch and the radius of curvature on the electrodes was 3/32 inch. These tests showed that with the voltages of 100,000 volts an air stream displacement of only 1/4 inch was required to de-ionize the gap. Hence, very fast repetition rates at very high voltages are obtainable with a pressurized voltage regulator constructed in accordance with the invention.

In a voltage regulator constructed in accordance with the invention and operated at atmospheric pressure with a power supply voltage of 25,000 volts and repetition rate of 1,000 spark extinctions per second, an air stream displacement of approximately one inch was required to extinguish the spark.

A further embodiment of the invention in which the arc in the spark gap is extinguished by a magnetic field rather than by an air jet is illustrated by the circuit shown in FIGURE 4 of the drawing. In this embodiment the electrodes 38 and 40, which define the spark gap, are positioned in a magnetic field such as may be provided by an electromagnetic structure comprising a core 100 of suitable magnetic material having a pair of opposing pole pieces 102 and 104, respectively disposed at opposite sides of the electrodes.

The center leg 106 of core 100 has a coil 108 wound therearound and the terminal conductors 110 and 112 of core 108 are adapted to be connected to a suitable source of energizing current for coil 108. Thus, it will readily be understood by those skilled in the art that when coil 108 is energized a magnetic field will exist between pole pieces 102 and 104. This magnetic field is transverse to the spark channel and when the gap breaks down, for the reasons described above, the spark is moved sidewise and extinguished, by the magnetic field, in a manner similar to the action of the air stream.

Manifestly, there are applications of the high voltage power supply voltage regulator described herein in which the use of a magnetic field is more convenient than the use of an air jet, and it is intended that the use of either means for extinguishing the spark across the gap in the novel voltage regulator is within the scope of the invention.

It further will be appreciated that for some applications, the use of the magnetic field facilitates operation of the invention in gases other than air which have desirable dielectric and arc quenching properties. In addition, the use of certain gas mixtures which have properties that aid in minimizing electrode erosion is facilitated.

Thus, there has been shown and described above a relatively simple, yet highly efficient apparatus for regulating the output of high voltage power supplies, and in particular such power supplies having widely varying loads thereon.

It will be understood by those skilled in the art that changes may be made in construction and arrangement of the parts in the disclosed illustrative embodiment without departing from the real spirit and scope of the invention, and that it is intended to cover by the appended claims any modified forms or structure or use of equivalents which may be reasonably included within their scope.

I claim as my invention:

1. In a high voltage power supply system of the type having a D.C. output of 1,000 volts or more from a pair of output terminals connected to the output of the high voltage power supply and a load connected to said output terminals, the improvement of a voltage regulating circuit connected to said output terminals comprising a pair of spaced apart electrodes defining a spark gap therebetween and adapted to break down at a voltage less than the unregulated power supply voltage at said terminals, to provide continuous sampling of said unregulated power supply voltage, a fluid source including a nozzle for supplying a continuous fluid stream to said gap to extinguish the sparks thereacross at a desired repetition rate to thereby maintain the D.C. power supply voltage to said load at a closely regulated value, said nozzle being operatively positioned adjacent said electrodes and connected to said fluid source for causing said fludi stream to be continuously blown through said gap and a pressure vessel forming a sealed enclosure for said pair of spaced apart electrodes and said nozzle for enabling said voltage regulator to be operated at pressures above atmospheric pressure.

2. A voltage regulating circuit for a high voltage power supply in accordance with claim 1 further comprising a fluid outlet communicating with the sealed enclosures of said pressure vessel and actuatable valve means associated with said fluid outlet for regulating the pressures within said enclosures.

3. In a high voltage power supply of the type having an unregulated D.C. output of 1,000 or more system, the improvement of a voltage regulating circuit comprising a pair of output terminals connected to the output of the high voltage power supply, a load connected to said output terminals, a pair of spaced apart electrodes defining a voltage breakdown spark gap there-between and adapted to break down at a voltage less than the unregulated power supply voltage at said terminals to provide continuous sampling of said unregulated power supply voltage, means connecting said electrodes to said pair of output terminals, and means associated with said electrodes for providing a magnetic field therearound, said magnetic field serving to extinguish the sparks across said electrodes in a repetitive manner for maintaining a constant current through said power supply and thereby maintaining a constant voltage output to said load.

4. A voltage regulating circuit in accordance with claim 3 wherein said means for providing a magnetic field comprises a core of magnetic material having a pair of pole pieces respectively disposed at opposite sides of the gap defined by said electrodes, and an electrically energizable coil wound around said core for causing a magnetic field to be maintained between said pole pieces.

5. A voltage regulating circuit in accordance with claim 4 wherein said pole pieces are oriented with respect to said pair of electrodes such that said magnetic field is transverse to the spark gap defined by said electrodes.

6. In a high voltage power supply system of the type having an unregulated D.C. output of 1,000 volts or more from a pair of output terminals connected to the output of the high voltage power supply and having a load connected to said output terminals, the improvement of a voltage regulating circuit connected to said output terminals comprising a pair of spaced-apart electrodes defining a voltage breakdown spark gap therebetween, said breakdown spark gap being dimensioned to break down at a voltage less than the unregulated power supply voltage at said terminals to provide continuous sampling of the unregulated power supply voltage, and means positioned adjacent to said voltage breakdown spark gap for repetitively extinguishing the sparks thereacross to maintain the power supply voltage to the load at a substantially constant value, said means comprising apparatus for producing a magnetic field for said spaced-apart electrodes whereby the sparks across said electrodes are caused to repetitively be moved out from the electrodes and extinguished by said magnetic field.

References Cited in the file of this patent

UNITED STATES PATENTS

| | | |
|---|---|---|
| 422,910 | Brown | Mar. 11, 1890 |
| 857,560 | Leblanc | June 18, 1907 |